United States Patent
Koundinya et al.

(10) Patent No.: US 11,805,183 B2
(45) Date of Patent: Oct. 31, 2023

(54) ORDERED STACK FORMATION WITH REDUCED MANUAL INTERVENTION

(71) Applicant: Hewlett Packard Enterprise Development LP, Houston, TX (US)

(72) Inventors: Chivukula Koundinya, Bangalore (IN); Balaji Sankaran, Bangalore (IN); Venkatavaradhan Devarajan, Bangalore (IN); Sivakumar Murugan, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 122 days.

(21) Appl. No.: 17/482,152

(22) Filed: Sep. 22, 2021

(65) Prior Publication Data

US 2023/0092836 A1 Mar. 23, 2023

(51) Int. Cl.
*H04L 29/08* (2006.01)
*H04L 12/775* (2013.01)
(Continued)

(52) U.S. Cl.
CPC ............ *H04L 67/51* (2022.05); *H04L 45/583* (2013.01)

(58) Field of Classification Search
CPC ... H04L 12/46; H04L 41/0654; H04L 41/046; H04L 41/0806; H04L 45/583;
(Continued)

(56) References Cited

U.S. PATENT DOCUMENTS

| | | | |
|---|---|---|---|
| 7,480,258 B1 * | 1/2009 | Shuen | H04L 45/00 370/256 |
| 9,485,323 B1 * | 11/2016 | Stickle | H04L 67/10 |

(Continued)

OTHER PUBLICATIONS

"Chapter: Virtual Switching Systems (VSS)" https://www.cisco.com/c/en/us/td/docs/switches/lan/catalyst6500/ios/12-2SX/configuration/guide/book/vss.html, Nov. 17, 2013, pp. 72.

(Continued)

*Primary Examiner* — Rasheed Gidado
(74) *Attorney, Agent, or Firm* — Park, Vaughan, Fleming & Dowler LLP

(57) ABSTRACT

A member switch of multiple connected switches receives a stack-discovery packet from a first coupled switch and, in response, generates and transmits a stack-discovery-response packet to the first coupled switch to allow the member switch to be discovered. The member switch receives stack-configuration information from a stack-control node and forwards the stack-discovery packet to a second coupled switch to facilitate discovery of the second coupled switch. The first coupled switch, the member switch, and the second coupled switch are coupled to each other according to a predetermined order, thereby facilitating an ordered discovery of the multiple connected switches. In response to receiving, from the stack-control node, a control packet, the member switch reboots based on the received stack-configuration information. The stack-configuration information comprises a stack-member identifier allocated, based on the predetermined order, by the stack-control mode to the member switch, thereby facilitating formation of an ordered stack.

16 Claims, 11 Drawing Sheets

(51) Int. Cl.
*H04L 67/51* (2022.01)
*H04L 45/58* (2022.01)

(58) Field of Classification Search
CPC ......... H04L 45/48; H04L 45/28; H04L 67/51; H04L 67/16; H04L 67/34
See application file for complete search history.

(56) References Cited

U.S. PATENT DOCUMENTS

| | | | |
|---|---|---|---|
| 9,602,441 B2* | 3/2017 | Kamble | H04L 41/12 |
| 2012/0002670 A1* | 1/2012 | Subramanian | H04L 49/55 |
| | | | 370/389 |
| 2013/0201875 A1* | 8/2013 | Anantharam | H04L 41/044 |
| | | | 370/255 |
| 2014/0362709 A1* | 12/2014 | Kashyap | H04L 43/04 |
| | | | 370/255 |
| 2018/0302289 A1* | 10/2018 | Shen | H04L 41/122 |
| 2019/0044848 A1* | 2/2019 | Shivaram | H04L 45/28 |

OTHER PUBLICATIONS

"Intelligent Resilient Framework" https://en.wikipedia.org/wiki/Intelligent_Resilient_Framework, Jan. 2010, pp. 3.

\* cited by examiner

ORDERED STACK FORMATION WITH REDUCED MANUAL INTERVENTION

BACKGROUND

This disclosure is generally related to forming a stack of switches using Front Plane Stacking (FPS). More specifically, this disclosure is related to a system and method that facilitates the formation of an ordered stack with reduced manual intervention.

BRIEF DESCRIPTION OF THE FIGURES

In the figures, like reference numerals refer to the same figure elements.

DETAILED DESCRIPTION

Figure 1:
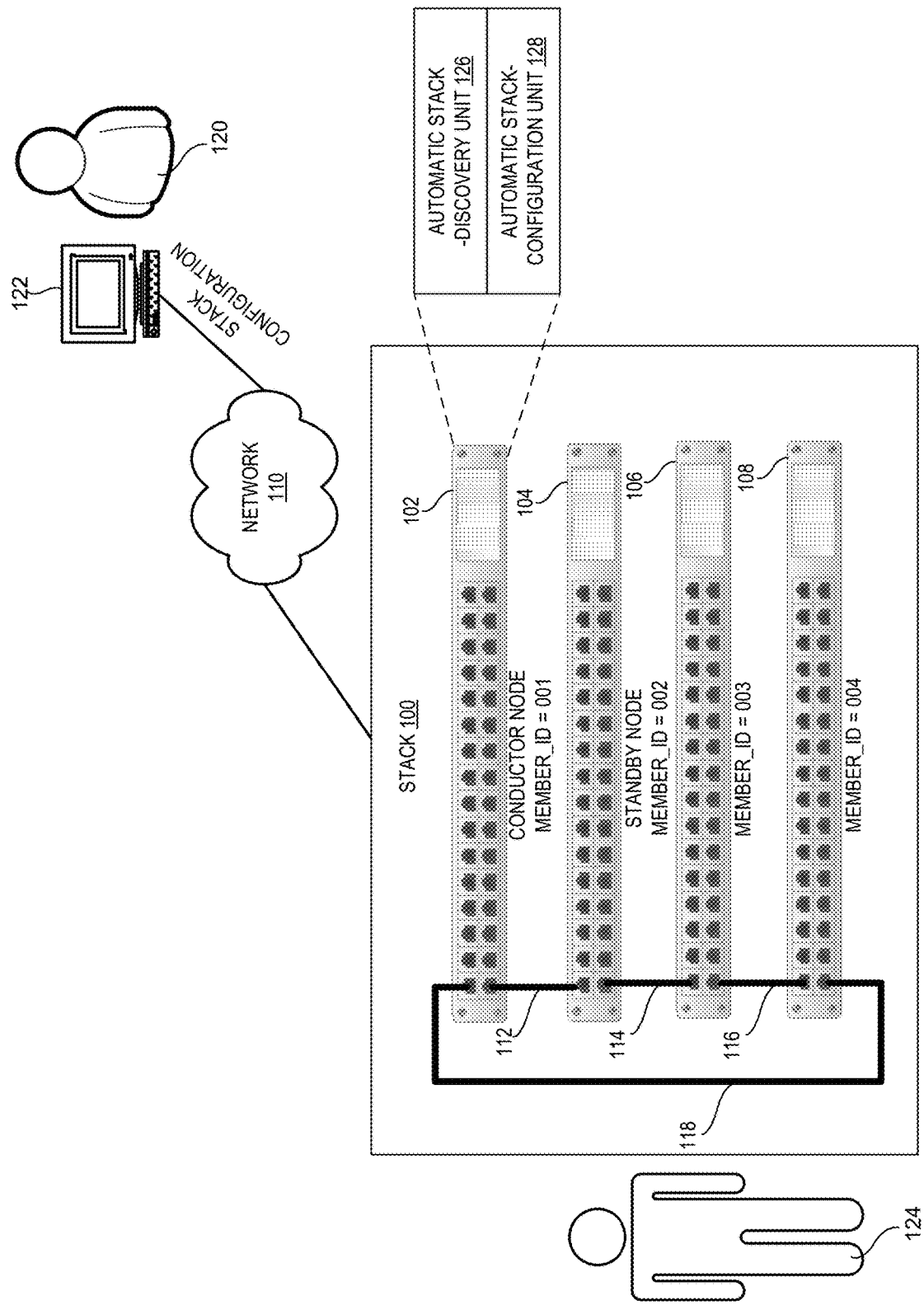
FIG. 1 illustrates a virtual switching framework (VSF) stack, according to one aspect of the application.

The following description is presented to enable any person skilled in the art to make and use the examples and is provided in the context of a particular application and its requirements. Various modifications to the disclosed examples will be readily apparent to those skilled in the art, and the general principles defined herein may be applied to other examples and applications without departing from the spirit and scope of the present disclosure. Thus, the scope of the present disclosure is not limited to the examples shown but is to be accorded the widest scope consistent with the principles and features disclosed herein.

Front Plane Stacking (FPS) is a network virtualization technology that virtualizes multiple physical switches in the same layer into one Virtual Switching Framework (VSF) stack to provide resiliency, scalability and higher bandwidth. FPS allows supported switches (members) to be connected to each other through dedicated point-to-point links (e.g., Ethernet links), referred to as FPS links. These links can carry encapsulated data plane traffic and also exchange control plane traffic that helps the stack to maintain its topology and state so as to behave like a single logical switch. In this disclosure, the terms FPS and VSF can be interchangeable. A stack of switches can be referred to as an FPS stack or a VSF stack. Similarly, the links carrying the stack traffic can be referred to as FPS links or VSF links.

Conventional approaches for automatic stack formation often result in switches being numbered out of order, which can make further maintenance difficult. Reordering the switches requires a significant amount of human intervention, which can be costly and time consuming. This disclosure provides a solution to the problem of forming an ordered stack using the FPS technology with reduced manual intervention. More specifically, an ordered stack can be formed automatically after the installer physically connects the switches using cables without further manual configuration of individual switches. According to one aspect of the application, a default stack configuration can be automatically generated by a selected stack-control node and sent to member switches in the stack. According to an alternative aspect, the stack configuration can be downloaded by the selected stack-control node from a remote network-management server and then sent to the peer switch nodes by the stack-control node. To ensure that an ordered stack can be formed, the stack-control node discovers the member switches in a predetermined order (e.g., in the order they are connected) and also assigns member IDs to the member switches according to the predetermined order. To discover a next-in-line member switch, the stack-control node advertises a stack-discovery or peer-discovery packet over a predetermined interface (which can be a default interface or an interface specified by the received stack-configuration file) and, in response, receives a stack-discovery-response or peer-discovery-response packet from a connected switch. This process can be repeated on each discovered member switch until all member switches in the stack are discovered one by one in the order they are connected. For each discovered member switch, the stack-control node allocates a member ID (which can be a numerical ID) and exchanges configuration information with the member switch. In one example, the member IDs are also allocated according to a predetermined order (e.g., from low to high) to discovered member switches. After all members are discovered by the stack-control node, the stack-control node can send control packets to the members, causing the members to reboot to apply the stack configuration.

FIG. 1 illustrates a virtual switching framework (VSF) stack, according to one aspect of the application. In this example, a VSF stack 100 can include four switches, switches 102, 104, 106, and 108. These four switches are stacked on top of each other and are connected using FPS, meaning that they are connected using standard Ethernet cables via standard Ethernet ports. In the example shown in FIG. 1, the four switches form a ring. More specifically, a cable 112 connects a port on switch 102 to a port on switch 104; a cable 114 connects a port on switch 104 to a port on switch 106; a cable 116 connects a port on switch 106 to a port on switch 108; and a cable 118 connects a port on switch 108 to a port on switch 102. VSF stack 100 can also be referred to a virtual chassis.

Among the four switches, switch 102 is on top of the stack and is selected as the stack-control node (also referred to as the conductor switch or simply the conductor) of stack 100, switch 104 is selected as the standby switch, and switches 106 and 108 are member switches of stack 100. A stack-control node or conductor in a stack runs the control and management plane protocols. More specifically, the conductor can be responsible for managing the databases, synchronizing them with the standby node, and controlling all line cards, including those of the standby node and the members. A standby switch is a stateful backup device for the conductor switch and can take control of the stack if the conductor is removed. This enables the stack to continue its operations seamlessly during a removal or a failure of the conductor. All devices in the stack other than the conductor switch and the standby switch are called member switches or simply members. A member switch does not run any networking protocol and has no state. All ports on the member switch are directly controlled and programmed by the conductor switch. When a standby switch takes over as the conductor, or a new standby switch is required, a member switch can be upgraded to take the role of a standby switch In the example shown in FIG. 1, stack 100 is considered an ordered stack with the switches numbered in sequence based on the order of their stack connections. In this particular example, the switches are connected from top to bottom, and the member IDs increment by one from the top to the bottom of the stack, with the top switch (switch 102) having a member ID 001 and the bottom switch (switch 108) having a member ID 004. Forming the stack in order can provide convenience in future maintenance efforts. For example, a network administrator 120 can monitor and manage stack 100 by accessing a network-management server 122, which is coupled to stack 100 via a network 110. Based on network monitoring data, network administrator 120 can determine that a switch with a member ID 003 is faulty and should be replaced. Network administrator 120 can send a working order to a maintenance person (e.g., an installer 124), who is responsible for physically disconnecting and connecting cables, to replace the switch. Because the switches are numbered in order, installer 124 can find the to-be-replaced switch with little effort. In this example, when installer 124 is instructed to replace a switch with a member ID 003, installer 124 can simply count three from the top switch to locate the third switch (i.e., switch 106), which is the to-be-replaced switch, and can then disconnect the identified switch and connect a new switch.

In existing FPS solutions, a stack can be formed when network administrator 120 explicitly logs in to each individual switch to configure the stack and then instructs installer 124 to physically connect the cables in order to form a stack with the specified size and topology. To reduce the amount of user intervention (e.g., the involvement of administrator 120), some vendors provide auto-stacking solutions that allow a stack to be formed automatically when an installer connects the cables and powers up the switches. However, these existing auto-stacking solutions have a number of drawbacks. One problem is that the stacks that are formed automatically can be out of order, because there is no built-in mechanism to ensure the formation of an ordered stack. For example, instead of having the member IDs incrementing from 001 to 004 from the top switch to the bottom switch, as shown in FIG. 1, the member IDs can become random (e.g., from the top to the bottom, member IDs can be 001-003-002-004). To correct this, the installer has to log in to individual switches to renumber them, thus defeating the purpose of automatic stacking. To get an ordered stack, existing auto-stacking solutions expect the installer to physically connect the cable and power up each switch and wait for that switch to join the stack before adding another switch. This requires lots of user intervention and can take a long time to form an ordered stack.

In existing auto-stacking solutions, there is no way to pre-designate a switch as a conductor. The auto-stacking process will designate a switch as the conductor based on a vendor-specific algorithm. Moreover, these auto-stacking solutions can complicate stack-onboarding workflows that use network-management tools. There can be multiple interactions and dependencies required between the network administrator and the installer during the stack formation process, and this requirement can hamper the mass deployment of stacks. In addition, to facilitate auto-stacking, some vendors support FPS with dedicated links by designating certain ports as FPS ports. Manual interventions (e.g., via a command-line interface (CLI) or a management server) are often used to change these designated FPS ports back to regular ports.

This disclosure provides an auto-stacking solution that can form an ordered stack without causing the abovementioned problems. According to one aspect, configurations of stacks can be done ahead of time using a network-management tool (e.g., a network-management server), thus allowing mass deployment of stacks. Using stack 100 shown in FIG. 1 as an example, when installer 124 connects switches 102-108 using cables 112-118 and connects the uplink from stack 100 to network 110, the stack configurations can be downloaded from network-management server 122 (e.g., in the form of a configuration file). Each switch, including conductor switch 102, can include an automatic stack-discovery unit 126 and an automatic stack-configuration unit 128. When the stack configurations are downloaded from network-management server 122, automatic stack-discovery unit 126 and automatic stack-configuration unit 128 can automatically perform the stack discovery and configuration processes to form a stack in the correct order, without any user intervention. In such a case, installer 124 just needs to connect the cables according to a predetermined order specified by the configuration, connect the uplink, power on the switches, and leave the closet housing the switches. There is no need for installer 124 to stay in the closet to cable up the switches one by one. This solution can significantly reduce the amount of user intervention and the amount of time used for forming an ordered stack.

In addition to connecting the switches sequentially based on their physical stacking order, the stack configuration may also specify a different switch-connecting pattern. For example, the stack configuration may specify that a switch should be connected not to an adjacent switch but to the next switch (e.g., switch 102 should be connected to switch 106, switch 104 should be connected to switch 108, etc.). Accordingly, installer 124 would receive the corresponding installation instructions and would connect the switches according to the instructions. In addition to specifying the connecting pattern among switches, the stack configuration may also specify the VSF ports on each switch to establish the VSF links. Note that a VSF link is a logical interface that connects VSF member devices (i.e., switches in the stack). The VSF link carries encapsulated data-plane traffic, as well as the control-plane traffic that helps the VSF stack to maintain its topology and state. When connecting the switches, installer 124 can connect the switches via the specified ports. For example, installer 124 can be instructed to connect port-2 of switch 102 to port-1 of switch 104 and port-2 of switch 104 to port-1 of switch 106.

According to an alternative aspect, instead of downloading the stack configurations from the network-management server, ordered stack 100 can be formed according to a default stack configuration in response to installer 124 manually selecting a switch (e.g., switch 102) as the conductor. For example, each switch can be equipped with a mode-selection button. When installer 124 presses the mode-selection button on a particular switch, the particular switch can be configured to operate in the conductor mode (e.g., to operate as a conductor). Moreover, in response to detecting that the mode-selection button being pressed, automatic stack-discovery unit 126 and automatic stack-configuration unit 128 can automatically perform the stack discovery and configuration based on the default configuration. In the example shown in FIG. 1, the default stack configuration can be that installer 124 should select the topmost switch (e.g., switch 102) as the conductor (e.g., by pressing its mode-selection button) and the switches are numbered incrementally from the top to the bottom. Depending on the implementation, it is also possible for the default stack configuration to specify that installer 124 should select the bottom switch (e.g., switch 108) as the conductor and the switches are numbered incrementally from the bottom to the top. Alternatively, installer 124 can be instructed to select any switch as the conductor, and the switches are numbered incrementally, starting from the selected switch, toward a predetermined direction. For example, installer 124 can select switch 104 as the conductor. Starting from switch 104 to the bottom of stack 100 and then back to the top, switches 104, 106, 108, and 102 can have incremental member IDs, such as 001, 002, 003, and 004, respectively. In another example, installer 124 can select switch 106 as the conductor. Starting from switch 106 to the top of stack 100 and then back to the bottom, switches 106, 104, 102, and 108 can have incremental member IDs, such as 001, 002, 003, and 004, respectively. The scope of this disclosure is not limited by the exact order of the switches in the stack, as long as the switches are numbered according to a predetermined order (either according to a user-defined configuration or by a default order).

When the default configuration is used (e.g., there is no configuration to be downloaded from the network-management server), installer 124 can connect the switches according to a predetermined default order. For example, each middle switch can be connected to its adjacent switches, and the top and bottom switches are connected to each other, as shown in FIG. 1. Moreover, if the default configuration is used, the switches can be connected to each other over their default interfaces that have been pre-configured to operate as a VSF interface. For example, all switches can have their port-1 and port-2 as VSF ports. Accordingly, when connecting the switches, installer 124 plugs the connecting cables into the default VSF ports.

Figure 2A:
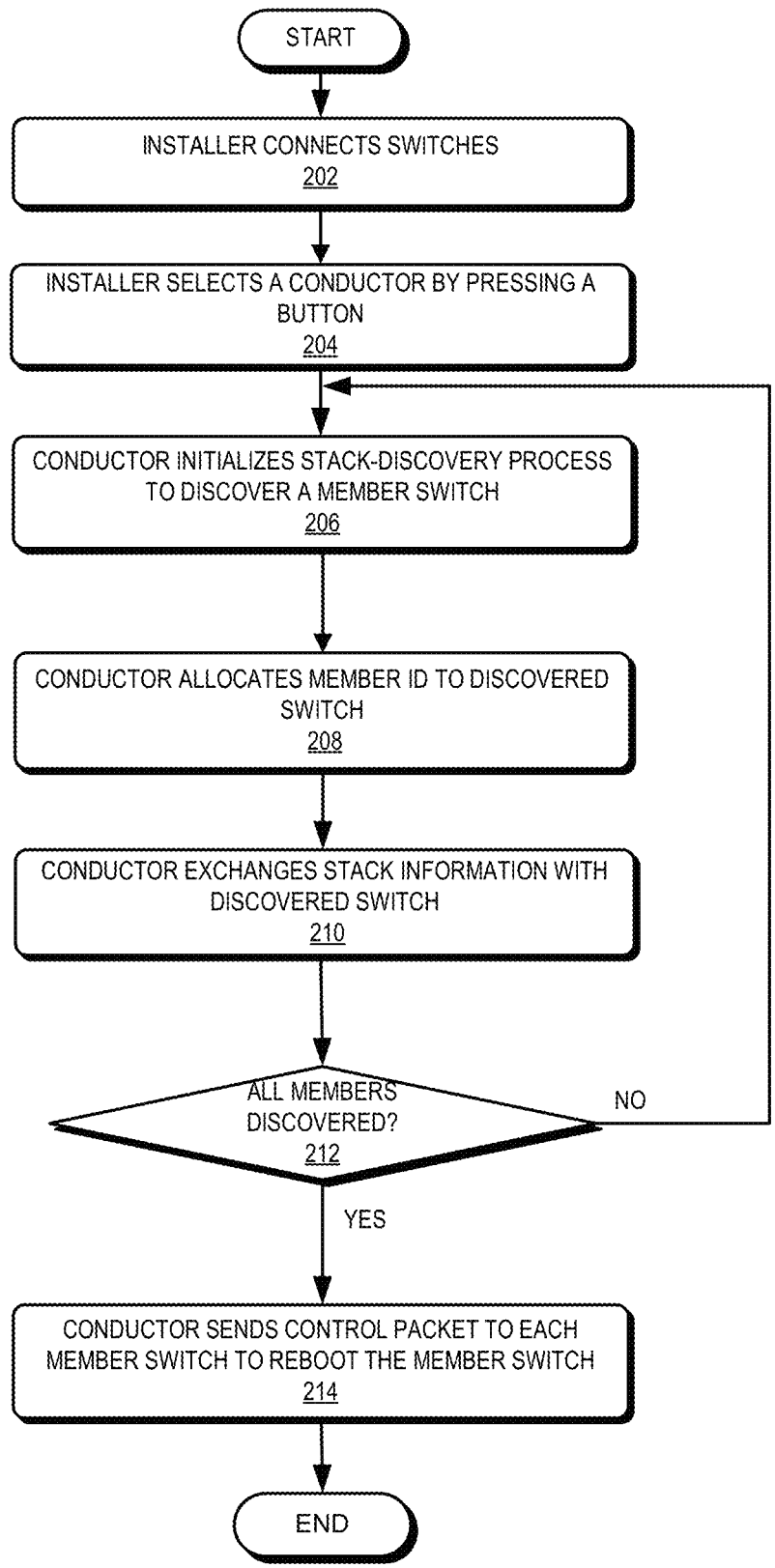
FIG. 2A presents a flowchart illustrating a process for automatic stack discovery and configuration, according to one aspect of the application.

FIG. 2A presents a flowchart illustrating a process for automatic stack discovery and configuration, according to one aspect of the application. In this example, the default stack configuration is used. During operation, a cable installer manually connects a set of switches via the default interfaces on each switch (operation 202). In one example, the switches can be connected according to a predetermined topology, such as a ring topology or a linear topology. Because there is no predetermined configuration, the installer can have the freedom to choose any connection scheme. According to one aspect, when using the default stack configuration, the installer can connect the switches according to the physical stacking order of the switches. For example, when the switches are stacked vertically, the cable installer can connect the switches one by one according to the vertical order (i.e., from top down or bottom up). Similarly, when the switches are stacked horizontally, the cable installer can connect the switches one by one according to the horizontal order (i.e., from left to right or right to left). Connecting the switches according to their stacking order can simplify the maintenance process.

Subsequent to connecting all switches, the cable installer can select a switch as a conductor switch by pressing the mode-selection button on the front panel of the selected switch (operation 204). Note that the installer can select any switch as the conductor. In one example, the installer can select a switch at an end of a stack of switches (e.g., the top/bottom switch or the leftmost/rightmost switch) as the conductor. Pressing the mode-selection button can trigger the automatic configuration of the FPS links on the default interface. According to one aspect, pressing the button can also result in the automatic configuration of a default standby switch (e.g., a switch directly coupled to the conductor on its default FPS interface).

Upon detecting that the mode-selection button is pressed and the FPS links configured, the automatic stack-discovery unit in the conductor can initialize the stack-discovery process to discover a member switch (operation 206). According to one aspect, the member switches can be discovered one by one according to a predetermined order (e.g., according to their connecting order). To each discovered member, the conductor allocates a member ID (operation 208). According to one aspect, the member IDs can be allocated according to the order in which they are discovered. For example, switches that are discovered earlier can be allocated with lower member IDs (or member IDs with smaller numerical values), whereas switches that are discovered later can be allocated with higher member IDs (or member IDs with larger numerical values). The conductor also exchanges stack information with a discovered member (operation 210). For example, the conductor can send a control packet indicating the stack configuration and receive a response from the discovered switch. When exchanging the stack information, the FPS link configuration (for all members) currently configured on the conductor switch is also exchanged.

The conductor can determine if all members in the stack have been discovered (operation 212). If not, the stack-discovery process continues to discover new member switches (operation 206). More specifically, the stack-discovery process can be executed on each discovered switch to allow a newly discovered switch to discover an additional member switch. If all members have been discovered, the conductor can send a control packet to each discovered switch to reboot the switch (operation 214). More specifically, the control packet can instruct the member switch to reboot with the received stack configurations and join the stack with the specific assigned role. For example, during reboot, the automatic stack-configuration unit on each switch can apply the stack configurations (including configuring the FPS interfaces and links). According to one aspect, the conductor can send the control packet one switch at a time, starting from the furthest switch. In a further example, a control packet is sent out until a response to a previous control packet is received. This ensures that all the members reboot substantially simultaneously, thus optimizing the stack formation time.

Figure 2B:
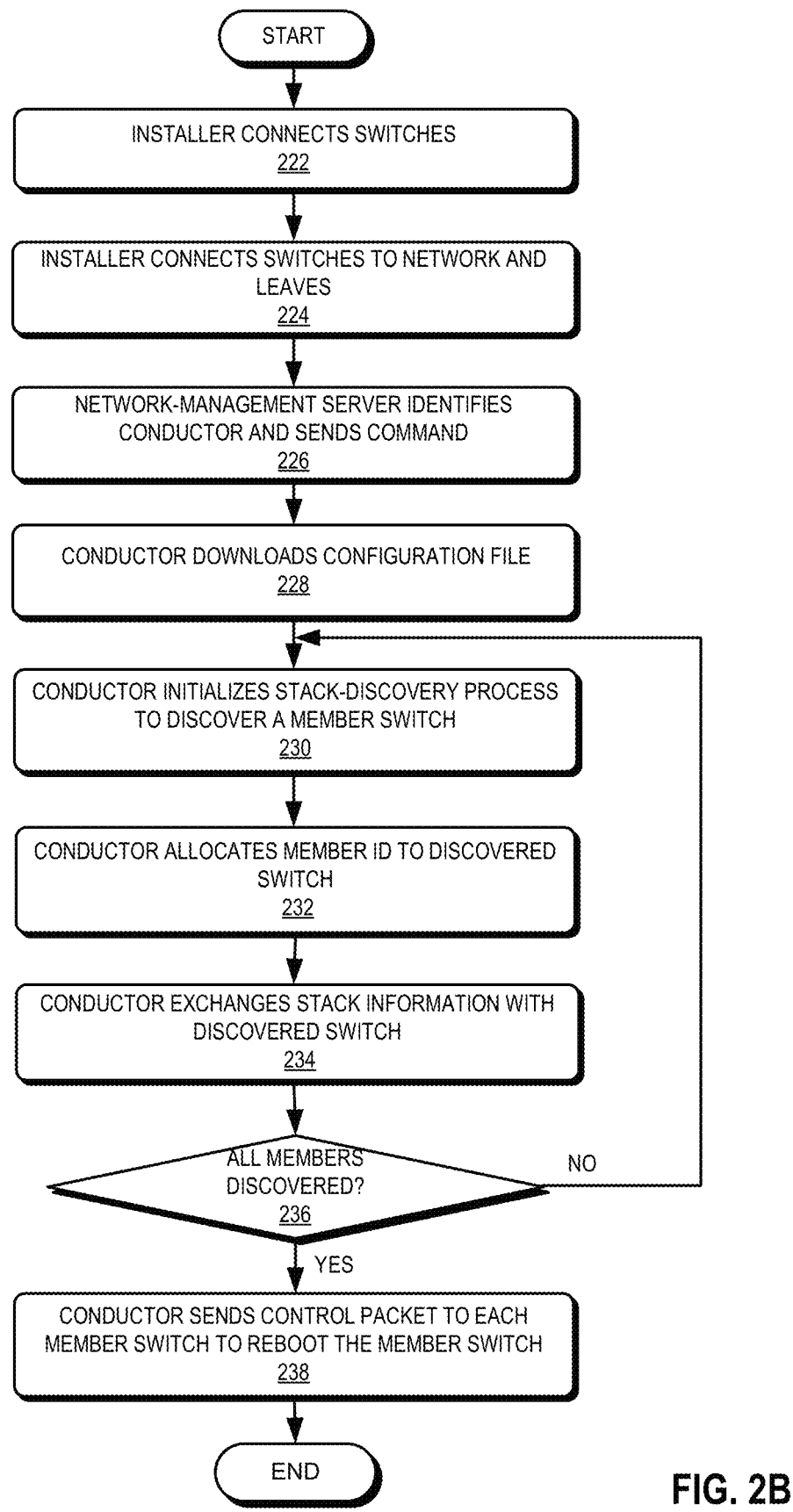
FIG. 2B presents a flowchart illustrating a process for automatic stack discovery and configuration, according to one aspect of the application.

FIG. 2B presents a flowchart illustrating a process for automatic stack discovery and configuration, according to one aspect of the application. In this example, the stack configuration has been previously generated by a network administrator. More specifically, the stack configuration can specify, among the multiple switches, which switch is the conductor. Moreover, the stack configuration can specify which ports on each switch should be used as FPS ports. During operation, a cable installer manually connects a set of switches according to a predetermined connecting pattern (operation 222). The connecting pattern is specified by the stack configuration. For example, the stack configuration can specify that a particular port on a particular switch is to be connected to another particular port on another particular switch.

Subsequent to connecting all switches, the cable installer can connect the uplink to the network and leave the closet housing the switches without performing any manual configuration (operation 224). Note that, in this case, the installer does not need to press any button.

Once the external network-management server detects that the switches are connected, the external network-management server identifies the conductor switch based on the stack configuration and the serial No. or MAC address of the conductor switch, and sends a command to the conductor switch (operation 226). More specifically, the network administrator can specify, in the configuration file, the serial No. or MAC address of a switch designated as the conductor. The external network-management server can then identify, among the connected switches, a switch with the matching serial No. or MAC address as the conductor switch. In response to receiving the command, the conductor switch downloads the stack-configuration file from the network-management server (operation 228). Upon completion of the download of the stack-configuration file, the conductor can initialize the stack-discovery process to discover a member switch (operation 230) and allocate a member ID to the discovered member switch (operation 232). According to one aspect, the member switches can be discovered one by one according to their connecting order, which is predetermined based on the stack configuration. In addition, the member IDs can be allocated according to the stack configuration, which can specify the member ID of each switch. The conductor also exchanges stack information with a discovered member (operation 234). For example, the conductor can send a control packet indicating the stack configuration and receive a response from the discovered switch. When the stack information is exchanged between the conductor and a member switch, the FPS link configuration for all members currently configured on the conductor switch is also exchanged.

The conductor can determine if all members in the stack have been discovered (operation 236). If not, the stack-discovery process continues to discover new member switches (operation 230). If all members have been discovered, the conductor can send a control packet to each discovered switch to reboot the switch (operation 238). The conductor can send the control packet one switch at a time, starting from the furthest switch. In one example, a control packet is sent out until a response to a previous control packet is received. This ensures that all the members reboot substantially simultaneously, thus optimizing the stack formation time.

Figure 3:
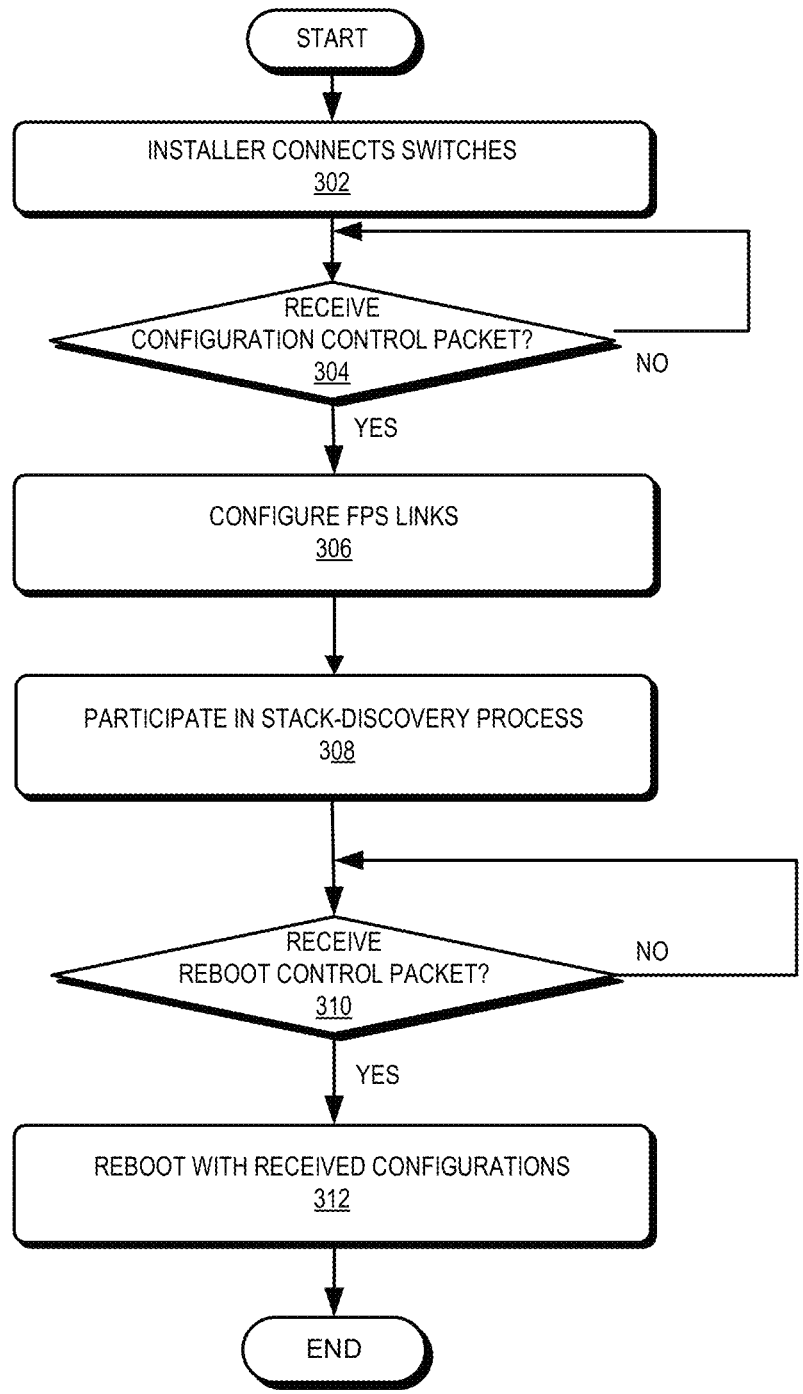
FIG. 3 presents a flowchart illustrating a process for automatic stack discovery and configuration, according to one aspect of the application.

Most operations in FIG. 2A and FIG. 2B are performed by the conductor switch, such as initializing the stack-discovery process, allocating member IDs to member switches, and sending out control packets to member switches. A different process can be performed by each member switch. FIG. 3 presents a flowchart illustrating a process for automatic stack discovery and configuration, according to one aspect of the application. During operation, a cable installer manually connects a set of switches via the default interfaces on each switch (operation 302). Subsequently, a member switch (i.e., a switch that is not selected as the conductor) waits for a control packet indicating the VSF configurations (operation 304). The control packet is sent by the selected conductor. The received VSF configurations can include the member ID allocated to the member switch. Upon receiving the VSF configurations, the member switch can configure the FPS links accordingly (operation 306) and participate in the stack-discovery process (operation 308). More specifically, once the FPS links are configured on the member switch, the member switch can discover additional member switches and forward information associated with the newly discovered members to the conductor. The member switch waits for a reboot control packet from the conductor (operation 310). In response to receiving the reboot control packet, the member switch reboots with the received VSF configurations, thus completing the process for joining the stack (operation 312).

In order to discover a member, the conductor can advertise a stack-discovery packet (e.g., a "hello" packet) on an FPS-enabled interface (which can be a default interface) and wait for a response. Once a member is discovered (i.e., the member has been allocated a member ID by the conductor), the discovered member can participate in the stack-discovery process by advertising its own stack-discovery packets and receiving stack-discovery-response packets.

Figure 4:
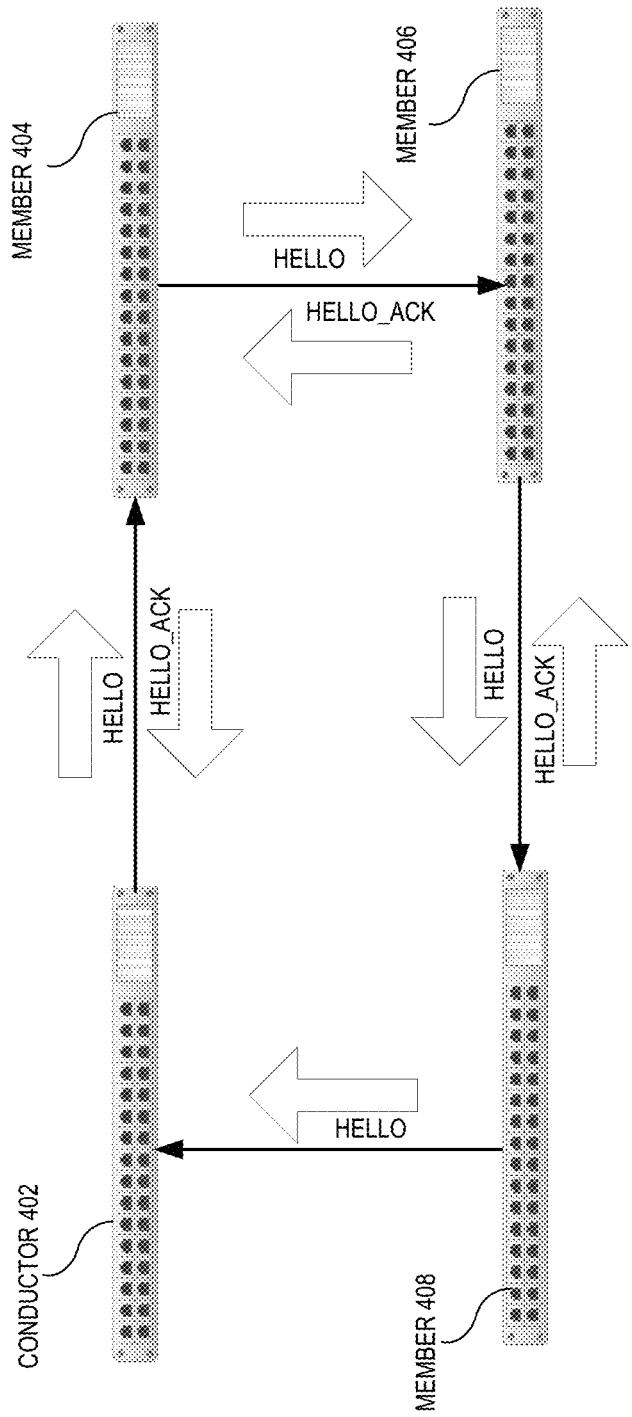
FIG. 4 presents a diagram illustrating the propagation of the stack-discovery packets and the stack-discovery response packets, according to one aspect of the application.

FIG. 4 presents a diagram illustrating the propagation of the stack-discovery packets and the stack-discovery response packets, according to one aspect of the application. In FIG. 4, a to-be-formed stack 400 includes four connected switches, a conductor 402, and members 404, 406, and 408. These four switches form a ring. According to one aspect of the application, in response to detecting being selected as a conductor (e.g., by detecting the node-selection button being pressed), conductor 402 can initialize the stack-discovery process by sending out a stack-discovery packet to a connected peer switch over a designated FPS interface. Note that the FPS interface can be a default port or a port specified by the stack configuration received from a network-management server. Because conductor switch 402 has a pair of FPS interfaces, member discovery can happen over both interfaces. In the ring topology shown in FIG. 4, conductor 402 can detect the last switch (e.g., switch 408) faster than other middle switches (e.g., switch 406) and may prematurely allocate a member number to the end switch. This can cause the stack to be formed with unordered member numbers. To avoid such a situation, according to one aspect, the discovery is only allowed in a predetermined direction. More specifically, the stack-discovery packet can only be sent on a predetermined interface from the pair of designated FPS interfaces. According to one aspect, the stack-discovery packet can only be sent on a higher denomination interface (e.g., the higher numbered port). For example, port-1 and port-2 are the default FPS ports on conductor 402; instead of sending the stack-discovery packet on port-1 or both ports, conductor 402 always sends the stack-discovery packet on port-2. According to an alternative aspect, the stack-discovery packet can only be sent on a lower denomination interface (e.g., the lower numbered port). Because the discovery of the member switches is allowed only in one direction, the stack can be formed with deterministic member numbers. In the example shown in FIG. 4, instead of sending a "hello" packet to member 408, conductor 402 sends the "hello" packet to member 404. Consequently, the member switches are discovered in the clockwise direction (i.e., member 404 is discovered first, followed by the discovery of member 406 and member 408).

Figure 5:
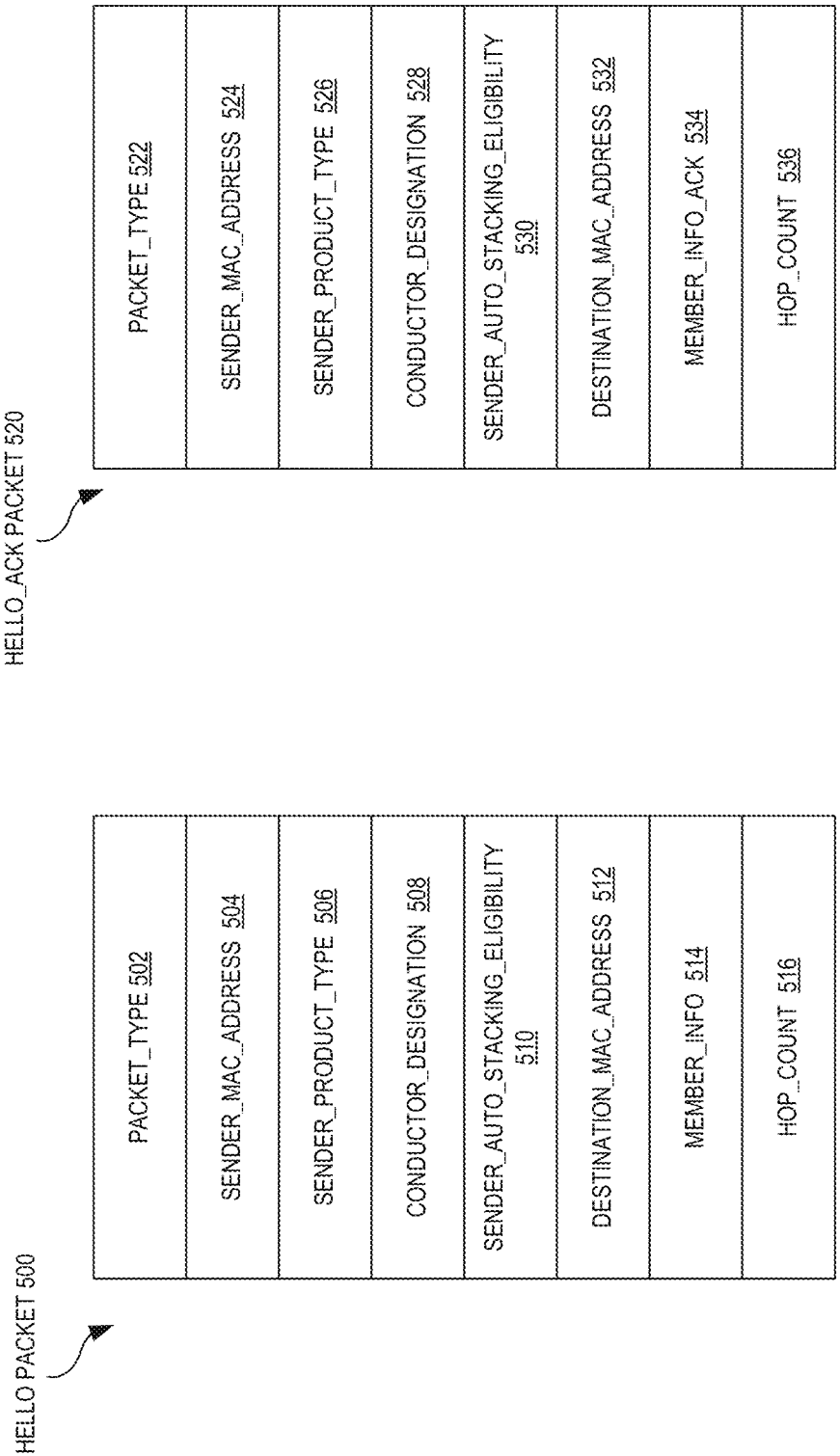
FIG. 5A illustrates the format of a stack-discovery packet, according to one aspect.
FIG. 5B illustrates the format of a stack-discovery-response packet, according to one aspect.

A stack-discovery packet (also referred to as a "hello" packet) can include information associated with the sender and recipient of the packet. FIG. 5A illustrates the format of a stack-discovery packet, according to one aspect. Stack-discovery or "hello" packet 500 can include a packet-type field 502, a sender-MAC-address field 504, a sender-product-type field 506, a conductor-designation field 508, a sender-automatic-stacking-eligibility field 510, a destination-MAC-address field 512, a member-information field 514, and a hop-count field 516.

Packet-type field 502 indicates the type of the packet. In this case, packet-type field 502 indicates that the packet is a stack-discovery packet. Sender-MAC-address field 504 indicates the media access control (MAC) address of the entity sending "hello" packet 500. The MAC address can uniquely identify the switch sending the "hello" packet. Sender-product-type field 506 indicates the product type of the switch. This information is useful to prevent the formation of a stack comprising incompatible switches. Conductor-designation field 508 indicates whether the entity sending the "hello" packet is a designated conductor or not. Sender-automatic-stacking-eligibility field 510 indicates whether the sender of the "hello" packet is eligible for automatic stacking. This field can be used to distinguish the switches that have been configured to allow automatic stack formation with the factory shipped switches.

Destination-MAC-address field 512 specifies the MAC address of the destination of the "hello" packet, and member-information field 514 includes information associated with a discovered member, including the member ID and FPS links coupled to the member. When the conductor sends out an initial "hello" packet, destination-MAC-address field 512 and member-information field 514 are left empty. Hop-count field 516 indicates the number of hops experienced by "hello" packet 500 before it is processed. The hop count increments by one each time "hello" packet 500 is forwarded.

Returning to FIG. 4, conductor 402 advertises an initial "hello" packet, which is received by switch 404. Upon receiving the "hello" packet, switch 404 checks the destination-MAC-address field. If the field is empty, switch 404 processes the "hello" packet and responds with a "hello_ack" packet. FIG. 5B illustrates the format of a stack-discovery-response packet, according to one aspect. Stack-discovery-response or "hello_ack" packet 520 can include a packet-type field 522, a sender-MAC-address field 524, a sender-product-type field 526, a conductor-designation field 528, a sender-automatic-stacking-eligibility field 530, a destination-MAC-address field 532, a member-information-acknowledgment field 534, and a hop-count field 536.

A number of fields in "hello_ack" packet 520 are similar to the fields in "hello" packet 500. These fields can provide information (e.g., MAC address, product type, etc.) specific to the switch sending the "hello_ack" packet (e.g., switch 404). When responding the "hello" packet, switch 404 can use the MAC address of conductor 402 to fill destination-MAC-address field 532. The hello_ack packet allows conductor 402 to learn the MAC address and device type of switch 404.

Returning to FIG. 4, once switch 404 processes the initial "hello" packet received from conductor 402 over an FPS port, switch 404 can forward the initial "hello" packet onto its other FPS port. In this example, the "hello" packet will be forwarded to switch 406, which can similarly process the "hello" packet and respond with a "hello_ack" packet. The "hello_ack" packet from switch 406 can be received by switch 404 and then forwarded by switch 404 to conductor 402. The same process repeats on each switch, allowing the initial "hello" packet to propagate along the ring until it arrives at conductor 402, which will not respond to the "hello" packet. Because all member switches respond to the "hello" packet with a "hello_ack" packet, and all "hello_ack" packets will arrive at conductor 402, conductor 402 can build the entire topology of the stack. For example, based on the sender MAC address and the hop count included each "hello_ack" packet, conductor 402 can determine the connecting pattern (or the connection sequence) among the member switches.

In addition to building the stack topology, conductor 402 can generate stack information (e.g., member ID and link configurations) for each member. According to one aspect, conductor 402 can send targeted information specific to each member via additional "hello" packets. More specifically, the additional "hello" packet can have its destination-MAC-address field and the member-information field filled. The targeted switch (i.e., the MAC address of the switch matches the destination-MAC-address) receives the additional "hello" packet and processes the stack member information included in the additional "hello" packet. According to one aspect, subsequent to processing the stack member information, the switch can also start a reboot timer. If a reboot packet is not received from conductor 402 after the reboot timer expires, the switch can reboot itself using the received configurations.

When a switch receives an additional "hello" packet that is not targeted to it, the receiving switch can forward the additional "hello" packet on its FPS links. Note that all "hello" packets terminate at conductor 402, thus avoiding loops. In addition, if a switch receives a forwarded packet that is sourced by the same switch (based on the sender_MAC_address field), the switch drops the packet.

Figure 6:
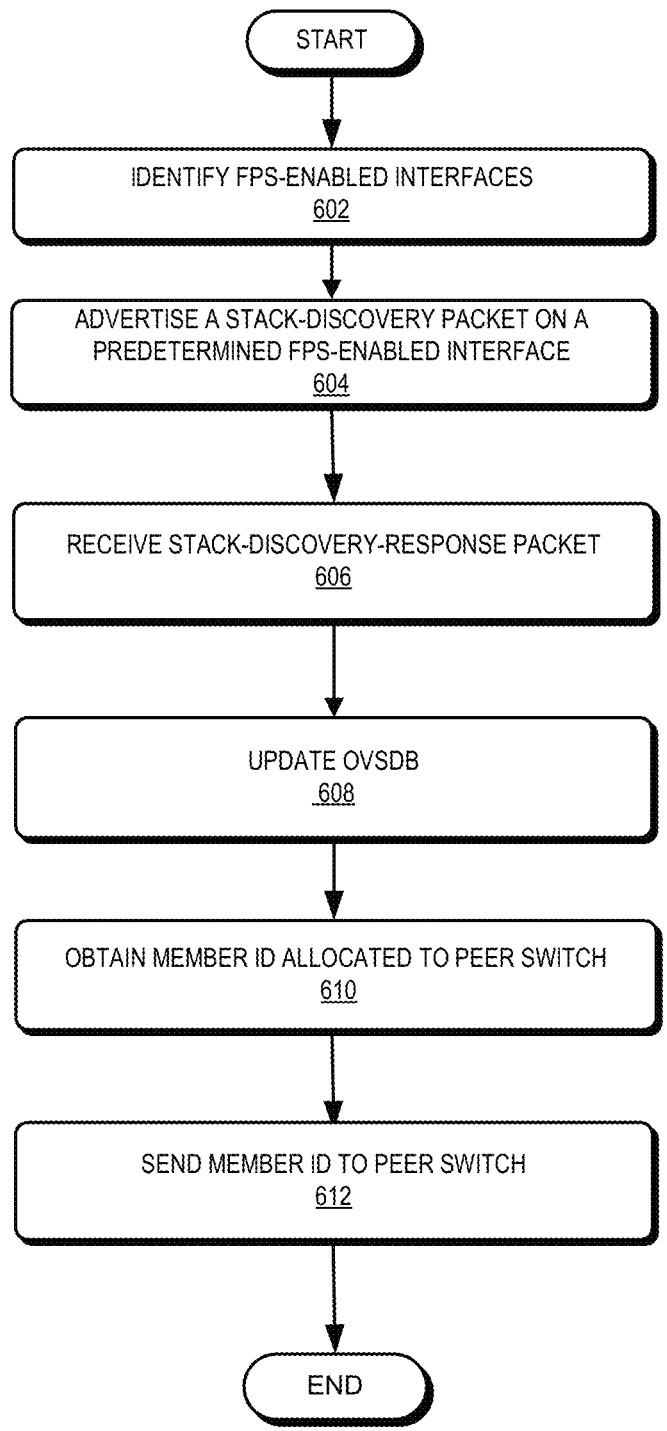
FIG. 6 presents a flowchart illustrating the stack-discovery process executed on a conductor switch, according to one aspect of the invention.

FIG. 6 presents a flowchart illustrating the stack-discovery process executed on a conductor switch, according to one aspect of the invention. During operation, the automatic stack-discovery unit on a conductor switch can identify the FPS-enabled interfaces (operation 602). As discussed before, when the default stack configuration is used, each switch has a pair of default interfaces for establishing FPS links, and the conductor will start discovery only through the FPS links. Note that all the FPS-capable interfaces in each switch act as regular ports until they receive control packets from the FPS links.

The automatic stack-discovery unit can advertise a stack-discovery packet on a predetermined FPS-enabled interface (operation 604). Depending on the implementation, the stack-discovery packet can be advertised on a lower order FPS interface or a higher order FPS interface. The automatic stack-discovery unit can subsequently receive a corresponding stack-discovery-response packet from a peer switch, such as an adjacent switch directly coupled to the conductor (operation 606). In response to receiving the stack-discovery-response packet, the automatic stack-discovery unit can update the open virtual switch database (OVSDB) using information associated with the peer switch included in the stack-discovery-response packet (operation 608). The automatic stack-discovery unit can then obtain the member ID allocated to the peer switch (operation 610) and send the member ID to the peer switch, thus completing the discovery of the peer switch (operation 612). According to one aspect, a separate member-ID-allocation unit on the conductor can allocate a member ID to the peer switch. The allocation of member IDs can be done according to a predetermined order. The member ID can be sent to the peer switch using an additional stack-discovery packet.

Figure 7:
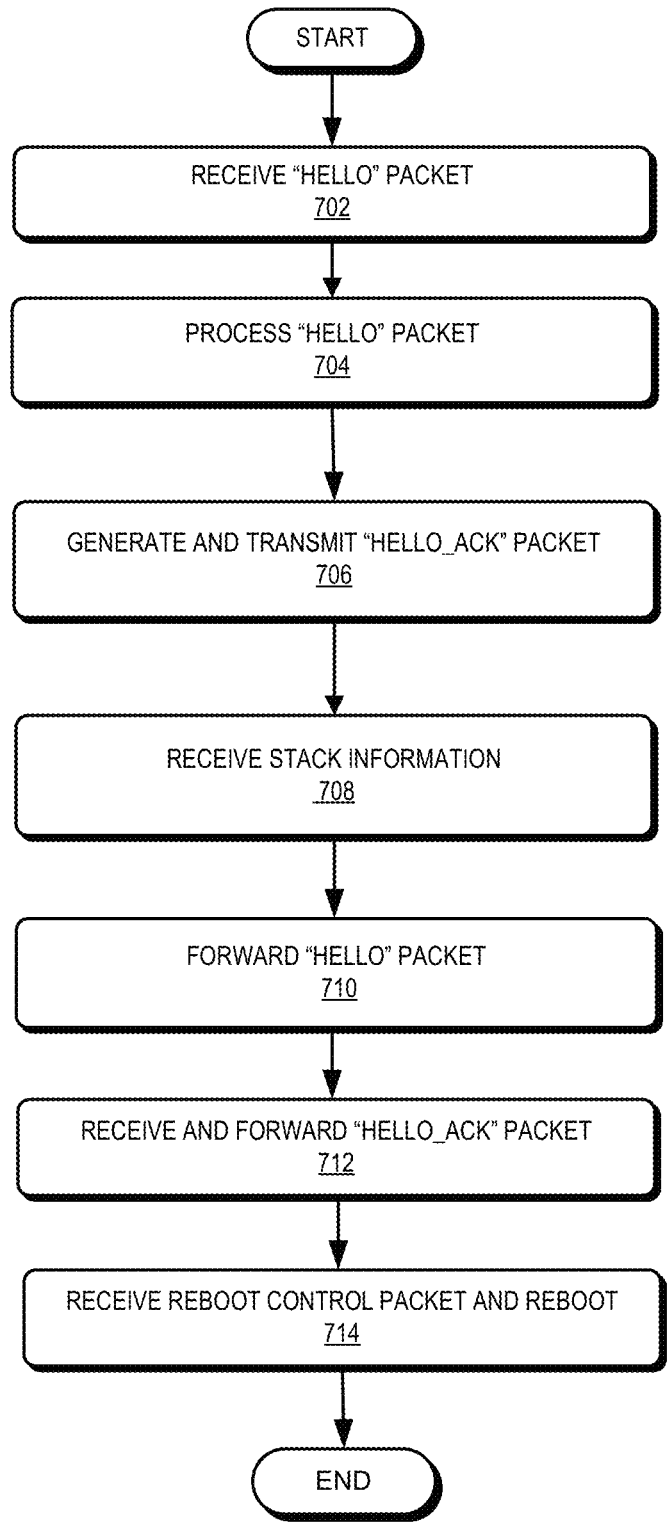
FIG. 7 presents a flowchart illustrating the stack-discovery process executed on a conductor switch, according to one aspect of the invention.

The stack-discovery process is initialized by the conductor but can also be executed by a member switch, once the member switch has been discovered. In other words, a discovered member can participate in the stack-discovery process to facilitate the discovery of new members. FIG. 7 presents a flowchart illustrating the stack-discovery process executed on a conductor switch, according to one aspect of the invention. During operation, a particular member switch can receive a "hello" packet on a predetermined interface (operation 702). The "hello" packet can originate from the conductor and can be forwarded to the member switch by a first adjacent switch (i.e., the switch coupled to the particular member switch). Upon receiving the "hello" packet, the member switch can process the "hello" packet (operation 704). For example, the member switch can determine if the "hello" packet is an initial packet by checking whether the destination-MAC-address field and the member-information field are empty. In response to the initial "hello" packet, the particular member switch can generate and transmit a "hello_ack" packet back to the first adjacent switch, which then forwards the "hello_ack" packet toward the conductor to allow the conductor to discover the particular member switch (operation 706). As discussed previously, once the conductor receives the "hello_ack" packet from the particular member switch, the conductor learns various types of information, including the MAC address and device type, associated with the particular member switch. The conductor can further generate and send stack-configuration information specific to the particular member switch to the particular member switch. The stack-configuration information can include a member ID allocated to the particular member switch by the conductor and FPS links associated with the particular member switch. According to one aspect, the conductor allocates member IDs according to a predetermined order. For example, members that are discovered earlier can be allocated lower order member IDs. The first adjacent switch is discovered before the particular member switch; hence, the first adjacent switch has a lower order member ID. The particular member switch can then receive, from the conductor, the stack-configuration information (operation 708). This completes the discovery of the particular member switch.

Once the particular member switch is discovered, it can further forward the received "hello" packet to a second adjacent switch via a second predetermined interface (operation 710). In response, the particular member switch can receive and forward, toward the conductor, a corresponding "hello_ack" packet, thus allowing the second adjacent switch to be discovered by the conductor (operation 712). Note that both interfaces are FPS-enabled interfaces, which can be default interfaces or specified by the stack configurations downloaded from a network-management server. Because the switches are coupled to each other according to a predetermined order (which can be a default order or an order specified by the downloaded stack-configuration file), they are discovered one by one according to the predetermined order. After all member switches have been discovered, the particular member switch can receive a reboot control packet from the conductor and reboot using the received stack configurations (operation 714).

Figure 8:
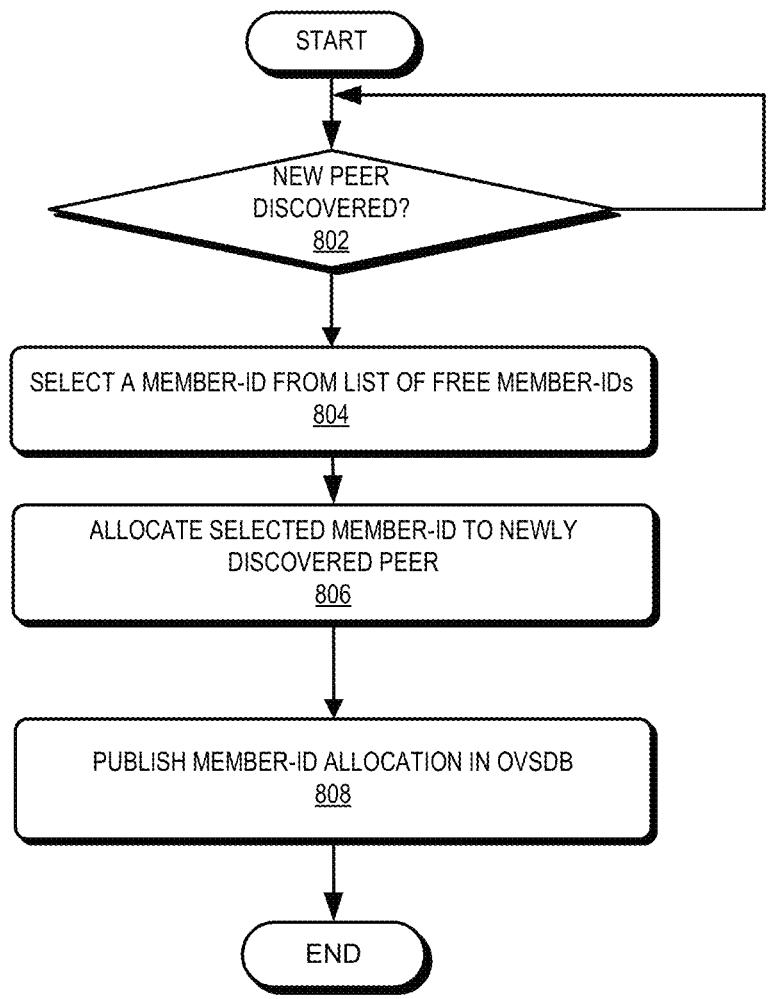
FIG. 8 presents a flowchart illustrating the member-ID-allocation process, according to one aspect of the invention.

FIG. 8 presents a flowchart illustrating the member-ID-allocation process, according to one aspect of the invention. This process is only executed by the conductor. During operation, a member-ID-allocation unit on the conductor monitors the OVSDB to determine whether a new peer switch has been discovered (operation 802). As discussed previously, each time the conductor receives a stack-discovery-response packet from a peer switch, it updates the OVSDB. In response to determining that a peer switch is discovered, the member-ID-allocation unit selects a member ID from a list of free member IDs (operation 804) and allocates the selected member ID to the newly discovered peer (operation 806). The member ID can be selected according to a predetermined algorithm or according to the stack-configurations downloaded from the network management server. According to one aspect, the auto-stacking uses a default configuration, and the member-ID-allocation unit can select a lowest ordered member ID from the list of free member IDs. This way, the member IDs can be allocated in the order the peer switches are discovered. To ensure that the member-ID-allocation unit will not allocate member IDs out of order, a member ID can be allocated to a discovered switch only after a previously discovered switch has been allocated a member ID. Moreover, numerical member IDs are issued according to a predetermined numerical order (e.g., from low to high or high to low). Because the peer switches are discovered in the order they are physically connected, the member IDs can be allocated in the same order, thus ensuring that the switches are numbered deterministically. When the auto-stacking uses the downloaded stack configurations, each switch can be allocated with a member ID specified by the stack configurations. Subsequent to allocating the member ID to the newly discovered peer, the member-ID-allocation unit publishes the member-ID-allocation in the OVSDB (operation 808). Such information can be used by the link discovery process.

Figure 9:
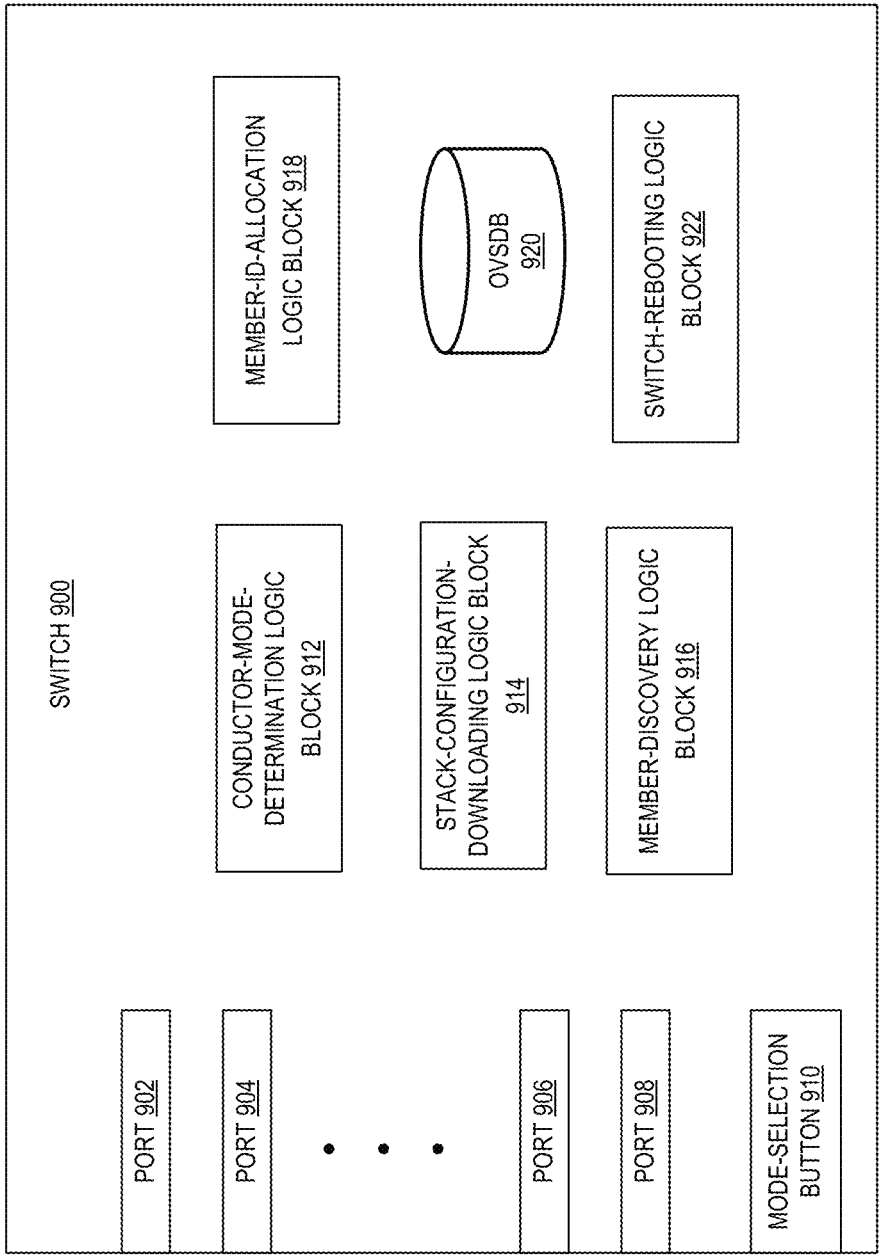
FIG. 9 illustrates a block diagram of a switch capable of performing automatic stacking, according to one aspect of the application.

FIG. 9 illustrates a block diagram of a switch capable of performing automatic stacking, according to one aspect of the application. Switch 900 can include, on its front panel, a number of ports (e.g., ports 902, 904, 906, and 908) and a mode-selection button 910. Switch 900 can also include a conductor-mode-determination logic block 912, a stack-configuration-downloading logic block 914, a member-discovery logic block 916, a member-ID-allocation logic block 918, an OVSDB 920, and a switch-rebooting logic block 922. Other standard switch components, such as the switch CPU, onboard memory, forwarding tables, queuing mechanism, etc., are not shown in FIG. 9.

Some or all of the ports of switch 900 are capable of functioning as FPS ports. However, before they receive control packets from configured FPS links, these ports can act as regular ports. According to one aspect, a pair of the ports (e.g., ports 902 and 904) can be configured as default FPS ports. Mode-selection button 910 allows a user (e.g., an installer responsible for connecting the switches) to manually select a conductor. When the installer presses mode-selection button 910 on a particular switch, that switch becomes the conductor of the to-be-formed stack, and the FPS links on that switch are configured.

Conductor-mode-determination logic block 912 can determine whether the current switch is operating in the conductor mode. Such a determination can be made based on the state of mode-selection button 910 (i.e., whether it has been pressed) or based on a command received from an external network-management server. The external network-management server can store stack configurations that were generated by network administrators. When the external network-management server detects that switches of a to-be-formed stack are physically connected (e.g., via Ethernet cables) to each other, it identifies the conductor switch (e.g., based on its MAC address) and sends a command to the identified conductor.

Stack-configuration-downloading logic block 914 can be responsible for downloading, from the external network-management server, a stack-configuration file comprising the stack configurations, including allocations of member IDs and FPS links. According to one aspect, stack-configuration-downloading logic block 914 starts to download the stack-configuration file in response to receiving a command from the external network-management server.

Member-discovery logic block 916 can be responsible for discovery of new members in the stack. According to one aspect, during discovery, member-discovery logic block 916 can advertise a stack-discovery packet on its FPS interfaces. If the current switch is a conductor, member-discovery logic block 916 also generates the advertised stack-discovery packet. Otherwise, the advertised stack-discovery packet is received from a discovered member. Stack-discovery packet can include information (e.g., MAC address, device type, auto-stacking eligibility, etc.) associated with the current switch. When the switches are connected to form a ring, to ensure that the stack can be formed in order, member-discovery logic block 916 can only advertise the stack-discovery packet on a predetermined FPS interface (e.g., a lower or higher order interface). Member-discovery logic block 916 can also receive responses to the member-discovery packet. The member-discovery-response packet from a switch can include stack information associated with the responding switch, including but not limited to: MAC address, device type, auto-stacking eligibility, etc. If the switch receiving the response is not the conductor, member-discovery logic block 916 can also be responsible for forwarding the response toward the conductor, thus facilitating the conductor to discover the member switch generating the response. Moreover, because the stack-discovery packet is forwarded by a discovered member to a next connected member, the members of the stack are discovered one by one, according to the order they are connected. The connecting order of the members can be a default order or an order specified by the stack-configuration file Member-ID-allocation logic block 918 is only activated on the conductor. In other words, if conductor-mode-determination logic block 912 determines that the current switch is a conductor, it will activate member-ID-allocation logic block 918. Otherwise, member-ID-allocation logic block 918 remains dormant. When activated, member-ID-allocation logic block 918 can be responsible for allocating member IDs to stack members discovered by member-discovery logic block 916. The member IDs are allocated according to a predetermined order, which can be a default order or an order specified by the stack-configuration file. According to one aspect, member-ID-allocation logic block 918 can select, from a pool of unused numerical member IDs, the lowest ordered member ID to allocate to a newly discovered member. Alternatively, the highest ordered member ID can be allocated to the newly discovered member. When a next member is discovered, member-ID-allocation logic block 918 can allocate a next lowest or highest order member ID to the next member. This can ensure that the member IDs are sequentially allocated based on the order they are discovered, thus facilitating the formation of an ordered stack. In addition to allocating member IDs, member-ID-allocation logic block 918 can also allocate FPS links to the discovered members. When a stack-configuration file is downloaded from the external network-management server, member-ID-allocation logic block 918 can allocate member IDs according to the user-defined stack configurations. For example, the user-defined stack configurations may specify that a switch matching a certain criteria should be allocated with a certain member ID.

OVSDB 920 stores stack information associated with all members in the stack, including but not limited to: the MAC address/member ID of the conductor, the MAC addresses/member IDs of the members, the device types, etc. OVSDB 920 is updated each time a member is discovered and each time a member ID is allocated. OVSDB 920 can also maintain a list of free member IDs.

Switch-rebooting logic block 922 can be responsible for rebooting a switch after the switch has been discovered and the stack information exchanged between the member switch and the conductor. If the current switch (i.e., switch 900) is the conductor, switch-rebooting logic block 922 can send control packets to other member switches to reboot those member switches. According to one aspect, switch-rebooting logic block 922 sends the control packets according to a predetermined order. To ensure that all switches can reboot substantially at the same time, switch-rebooting logic block 922 can send the reboot control packets to member switches one by one, starting from the furthest switch (i.e., the switch discovered the last) to the closest switch (i.e., the first discovered switch). If the current switch is not the conductor, switch-rebooting logic block 922 can reboot the switch in response to receiving a control packet from the conductor. In another example, switch-rebooting logic block 922 can start a timer after the switch receives the stack configuration (e.g., member ID and FPS links) from the conductor. If the timer expires before a reboot control packet is received, switch-rebooting logic block 922 reboots the switch with the received stack configuration.

Figure 10:
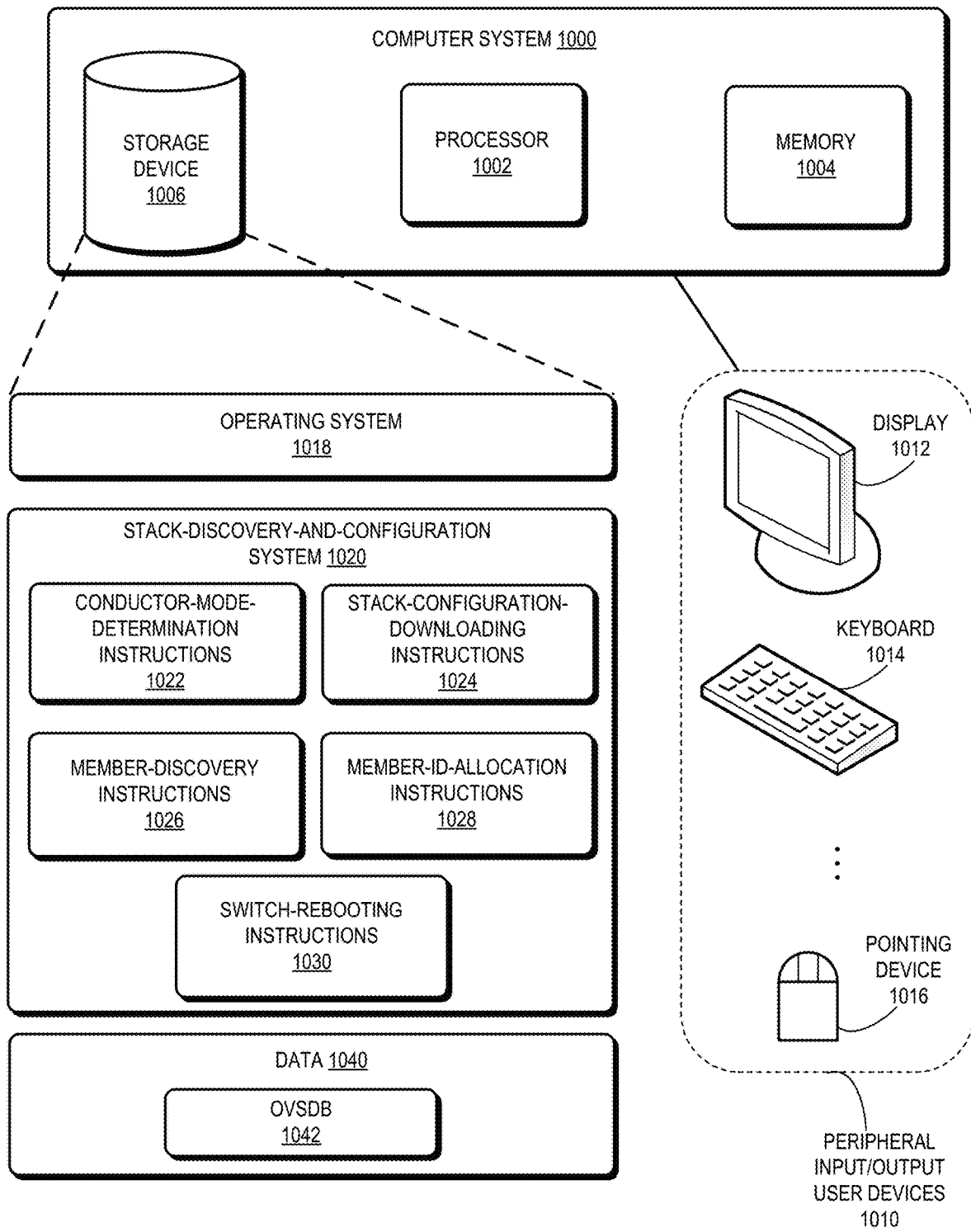
FIG. 10 illustrates a computer system that facilitates automatic discovery and configuration of a stack, according to one aspect of the application.

FIG. 10 illustrates a computer system that facilitates automatic discovery and configuration of a stack, according to one aspect of the application. Computer system 1000 includes a processor 1002, a memory 1004, and a storage device 1006. Furthermore, computer system 1000 can be coupled to peripheral input/output (I/O) user devices 1010, e.g., a display device 1012, a keyboard 1014, and a pointing device 1016. Storage device 1006 can store an operating system 1018, a stack-discovery-and-configuration system 1020, and data 1040. According to one aspect, computer system 1000 can be part of a network switch.

Stack-discovery-and-configuration system 1020 can include instructions, which when executed by computer system 1000, can cause computer system 1000 or processor 1002 to perform methods and/or processes described in this disclosure. Specifically, stack-discovery-and-configuration system 1020 can include instructions for determining whether the current switch is a conductor of the stack (conductor-mode-determination instructions 1022), instructions for downloading a stack-configuration file from an external network-management server (stack-configuration-downloading instructions 1024), instructions for automatic discovery of members (member-discovery instructions 1026), instructions for allocating member IDs (member-ID-allocation instructions 1028), and instructions for rebooting the switch (switch-rebooting instructions 1030). Data 1040 can include OVSDB 1042.

In general, this disclosure provides a system and method for automatic formation of an ordered stack using the FPS technology. More specifically, the provided solution allows for a deterministic and ordered way to form the stack with required topology and roles. The installer only needs to physically connect the switches using cables according to a predetermined connecting pattern (which can be a default pattern or a pattern specified by user-defined stack configurations, powers up the switches, and connects the uplinks (e.g., connects the switches to the network). The installer does not need to log in to a switch (e.g., via a CLI interface) to manually configure the switch. Each switch can be equipped with a mode-selection button to allow the installer to select a conductor by pressing the button. This allows offline stack formation without CLI access. In addition to using a default stack configuration, this solution also allows the user-defined stack configurations to be downloaded from a remote network-management server to a conductor switch specified by the stack configurations. Once the conductor switch is determined (either by the installer pressing a button or by the remote network-management server sending a command), the conductor switch can initialize the automatic stack-discovery process, which involves the conductor sending stack-discovery packets and receiving stack-discovery-response packets. More specifically, the conductor switch can discover the member switches one at a time, based on the connecting pattern of the switches. The conductor switch can also be configured to allocate member IDs to discovered switches. The member IDs can be allocated one switch at a time according to a predetermined order, which can be a default order (e.g., from a lower number to a higher number or vice versa) or the order specified by the user-defined stack configurations. The disclosed solution can also reduce the stack formation time by rebooting all the members substantially at the same time instead of one by one. To do so, the conductor can send out reboot packets one switch at a time, starting from the furthest or the last discovered switch. The disclosed solution reduces the amount of manual interventions during stack formation. Moreover, the disclosed solution reduces the amount of interactions between the network administrator and the installer.

One aspect of the instant application provides a system and method for facilitating automatic stack formation. During operation, a member switch of multiple connected switches receives a stack-discovery packet from a first coupled switch. In response to receiving the stack-discovery packet, the member switch generates and transmits a stack-discovery-response packet to the first coupled switch to allow the member switch to be discovered. The member switch receives stack-configuration information from a stack-control node and forwards the stack-discovery packet to a second coupled switch to facilitate discovery of the second coupled switch. The first coupled switch, the member switch, and the second coupled switch are coupled to each other according to a predetermined order, thereby facilitating an ordered discovery of the multiple connected switches. In response to receiving, from the stack-control node, a control packet, the member switch reboots based on the received stack-configuration information. The stack-configuration information comprises a stack-member identifier allocated, based on the predetermined order, by the stack-control mode to the member switch, thereby facilitating formation of an ordered stack.

In a variation on this aspect, the member switch receives from the second coupled switch, a second stack-discovery-response packet and forwards the second stack-discovery-response packet to the stack-control node.

In a variation on this aspect, the member switch is coupled to the first and second coupled switches via first and second predetermined interfaces capable of implementing front plane stacking (FPS), and the first and second predetermined interfaces are default interfaces or interfaces specified by a user-defined stack configuration.

In a variation on this aspect, the stack-discovery packet comprises a media access control (MAC) address of the stack-control node, and the stack-discovery-response packet comprises a MAC address of the member switch.

In a variation on this aspect, the stack-configuration information is included in an additional stack-discovery packet targeting the member switch.

In a variation on this aspect, the predetermined order is a default order or an order specified by a user-defined stack configuration.

One aspect of the instant application provides a system and method for facilitating automatic stack formation. During operation, in response to receiving a mode-selection command, a stack-control node initializes a stack-discovery process, which comprises: advertising a peer-discovery message on a predetermined port; receiving a peer-discovery-response message from a first member switch, thereby facilitating discovery of the first member switch; allocating, by the stack-control node according to a predetermined order, a stack-member identifier to the discovered first member switch; transmitting configuration information comprising the stack-member identifier to the discovered first member switch; and causing the discovered first member switch to forward the peer-discovery message to a second member switch, thereby facilitating discovery of the second member switch. The stack-control node transmits a control packet to each discovered member switch to reboot the discovered member switch based on the configuration information associated with the discovered member switch, thereby facilitating formation of an ordered stack.

In a variation on this aspect, the stack-control node receives, from the second member switch via the first member switch, a second peer-discovery-response packet.

In a variation on this aspect, the stack-control node comprises a pair of default ports that implement front plane stacking (FPS), and the predetermined port is a higher order port selected from the pair of default ports.

In a variation on this aspect, the stack-member identifier comprises a numerical identifier, and allocating the stack-member identifier according to the predetermined order comprises selecting a lowest ordered stack-member identifier from a set of unused stack-member identifiers.

In a variation on this aspect, the peer-discovery packet comprises a media access control (MAC) address of the stack-control node, and the peer-discovery-response packet comprises a MAC address of the first member switch.

In a variation on this aspect, transmitting the configuration information comprises including the configuration information in an additional peer-discovery packet targeting the first member switch.

In a variation on this aspect, receiving the mode-selection command comprises detecting an installer pressing a mode-selection button on the stack-control node or receiving the mode-selection command from an external network-management server.

In a further variation, in response to receiving the mode-selection command from the external network-management server, the stack-control node downloads a stack-configuration file from the network-management server. The stack-configuration file specifies stack-member identifiers to be allocated to member switches.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed.

When the hardware modules or apparatus are activated, they perform the methods and processes included within them.

The foregoing descriptions have been presented for purposes of illustration and description only. They are not intended to be exhaustive or to limit the scope of this disclosure to the forms disclosed. Accordingly, many modifications and variations will be apparent to practitioners skilled in the art.

What is claimed is:

1. A method for facilitating automatic stack formation, comprising:
   receiving, by a member switch of multiple connected switches, a stack-discovery packet from a first coupled switch;
   in response to receiving the stack-discovery packet, generating and transmitting a stack-discovery-response packet to the first coupled switch to allow the member switch to be discovered;
   receiving stack-configuration information from a stack-control node, wherein the stack-control node is configured to receive a mode-selection command from an external network-management server and download a stack-configuration file comprising the stack-configuration information from the network-management server, and wherein the stack-configuration file specifies stack-member identifiers to be allocated to member switches;
   forwarding, by the member switch, the stack-discovery packet to a second coupled switch to facilitate discovery of the second coupled switch, wherein the first coupled switch, the member switch, and the second coupled switch are coupled to each other according to a predetermined order, thereby facilitating an ordered discovery of the multiple connected switches; and
   in response to receiving, by the member switch from the stack-control node, a control packet, rebooting the member switch based on the received stack-configuration information, wherein the stack-configuration information comprises a stack-member identifier allocated, based on the predetermined order, by the stack-control mode to the member switch, thereby facilitating formation of an ordered stack.

2. The method of claim 1, further comprising:
   receiving, by the member switch from the second coupled switch, a second stack-discovery-response packet; and
   forwarding the second stack-discovery-response packet to the stack-control node.

3. The method of claim 1, wherein the member switch is coupled to the first and second coupled switches via first and second predetermined interfaces capable of implementing front plane stacking (FPS), and wherein the first and second predetermined interfaces are default interfaces or interfaces specified by a user-defined stack configuration.

4. The method of claim 1, wherein the stack-discovery packet comprises a media access control (MAC) address of the stack-control node, and wherein the stack-discovery-response packet comprises a MAC address of the member switch.

5. The method of claim 1, wherein the stack-configuration information is included in an additional stack-discovery packet targeting the member switch.

6. The method of claim 1, wherein the predetermined order is a default order or an order specified by a user-defined stack configuration, and wherein the multiple connected switches are discovered along a predetermined direction.

7. A method for facilitating automatic stack formation, comprising:
   in response to receiving, by a stack-control node, a mode-selection command from an external network-management server, downloading a stack-configuration file from the network-management server, wherein the stack-configuration file specifies stack-member identifiers to be allocated to member switches; and
   initializing, by the stack-control node, a stack-discovery process, which comprises:
      advertising a peer-discovery message on a predetermined port;
      receiving a peer-discovery-response message from a first member switch, thus resulting in discovery of the first member switch;
      allocating, by the stack-control node according to a predetermined order, a stack-member identifier to the discovered first member switch;
      transmitting configuration information comprising the stack-member identifier to the discovered first member switch; and
      causing the discovered first member switch to forward the peer-discovery message to a second member switch, thereby facilitate discovery of the second member switch; and
   transmitting, by the stack-control node, a control packet to each discovered member switch to reboot the discovered member switch based on the configuration information associated with the discovered member switch, thereby facilitating formation of an ordered stack.

8. The method of claim 7, further comprising:
   receiving, from the second member switch via the first member switch, a second peer-discovery-response packet.

9. The method of claim 7, wherein the stack-control node comprises a pair of default ports that implement front plane stacking (FPS), wherein the predetermined port is a higher order port selected from the pair of default ports, and wherein member switches in the stack are discovered along a predetermined direction, starting from a member switch coupled to the predetermined port of the stack-control node.

10. The method of claim 7, wherein the stack-member identifier comprises a numerical identifier, and wherein allocating the stack-member identifier according to the predetermined order comprises selecting a lowest ordered stack-member identifier from a set of unused stack-member identifiers.

11. The method of claim 7, wherein the peer-discovery packet comprises a media access control (MAC) address of the stack-control node, and wherein the peer-discovery-response packet comprises a MAC address of the first member switch.

12. The method of claim 7, wherein transmitting the configuration information comprises including the configuration information in an additional peer-discovery packet targeting the first member switch.

13. A computer system, comprising:
   a processor; and
   a non-transitory computer-readable storage medium storing instructions, which when executed by the processor causes the processor to perform a method for facilitating automatic stack formation, the method comprising:
      in response to receiving, by a stack-control node, a mode-selection command, from an external network-management server, downloading a stack-configuration file from the network-management server, wherein the stack-configuration file specifies stack-member identifiers to be allocated to member switches; and initializing, by the stack-control node, a stack-discovery process, which comprises:
  advertising a peer-discovery message on a predetermined port;
  receiving a peer-discovery-response message from a first member switch, thus resulting in discovery of the first member switch;
  allocating, by the stack-control node according to a predetermined order, a stack-member identifier to the discovered first member switch;
  transmitting configuration information comprising the stack-member identifier to the discovered first member switch; and
  causing the discovered first member switch to forward the peer-discovery message to a second member switch, thereby facilitating discovery of the second member switch; and transmitting, by the stack-control node, a control packet to each discovered member switch to reboot the discovered member switch based on the configuration information associated with the discovered member switch, thereby facilitating formation of an ordered stack.

14. The computer system of claim 13, wherein the stack-member identifier comprises a numerical identifier, and wherein allocating the stack-member identifier according to the predetermined order comprises selecting a lowest ordered stack-member identifier from a set of unused stack-member identifiers.

15. The computer system of claim 13, wherein the peer-discovery packet comprises a media access control (MAC) address of the stack-control node, and wherein the peer-discovery-response packet comprises a MAC address of the first member switch.

16. The computer system of claim 13, wherein transmitting the configuration information comprises including the configuration information in an additional peer-discovery packet targeting the first member switch.

* * * * *